(12) United States Patent
Wittmann et al.

(10) Patent No.: US 11,117,749 B2
(45) Date of Patent: Sep. 14, 2021

(54) APPARATUS FOR HANDLING ARTICLES AS WELL AS METHOD FOR EXCHANGING AT LEAST ONE TRANSPORT MODULE AND AT LEAST ONE WORK MODULE OF THE APPARATUS

(71) Applicant: KRONES Aktiengesellschaft, Neutraubling (DE)

(72) Inventors: Stephan Wittmann, Neubeuern (DE); Juergen Werner, Bruckmühl (DE); Herbert Spindler, Niedermoosen (DE)

(73) Assignee: KRONES Aktiengesellschaft, Neutraubling (DE)

( * ) Notice: Subject to any disclaimer, the term of this patent is extended or adjusted under 35 U.S.C. 154(b) by 541 days.

(21) Appl. No.: 15/911,568

(22) Filed: Mar. 5, 2018

(65) Prior Publication Data

US 2018/0251315 A1 Sep. 6, 2018

(30) Foreign Application Priority Data

Mar. 6, 2017 (DE) .......................... 102017203588.9

(51) Int. Cl.
*B65G 21/10* (2006.01)
*B65B 35/24* (2006.01)
(Continued)

(52) U.S. Cl.
CPC .............. *B65G 21/10* (2013.01); *B65B 35/24* (2013.01); *B65B 35/44* (2013.01); *B65B 59/003* (2019.05); *B65B 59/005* (2013.01)

(58) Field of Classification Search
CPC ........ B65G 21/10; B65G 21/12; B65G 21/14; B65G 2207/16; B65G 37/00;
(Continued)

(56) References Cited

U.S. PATENT DOCUMENTS 2,682,216 A * 6/1954 Shields ................... B65B 61/24
100/151
5,421,446 A * 6/1995 Koch ................... B65G 47/647
198/369.7
(Continued)

FOREIGN PATENT DOCUMENTS

CN 204453845 U 7/2015
CN 105600033 A 5/2016
(Continued)

OTHER PUBLICATIONS

Chinese First Office Action dated Nov. 4, 2019.
DE 2017 203 588.9 Filed Mar. 6, 2017; German Search Report dated Oct. 2, 2017.

*Primary Examiner* — Joshua G Kotis
(74) *Attorney, Agent, or Firm* — Simmons Perrine Moyer Bergman PLC

(57) ABSTRACT

The invention relates to an apparatus (1) with at least two modules that are selectively transferable into a specific operating position (BL) for handling of individual articles or article sets. The apparatus (1) comprises at least one transport module (3) that moves individual articles or article sets with a first packaging type and at least one work module (5) that moves individual articles or article sets with a second, different, packaging type. The work module (5) can handle packaging material during the movement, with the packaging material being in contact with the individual articles or article sets. The apparatus (1) has an operating position (BL) and a waiting position (W1), into which operating position (BL) the transport module (3) or the work module (5) can be selectively inserted, and into which waiting position (W1) the transport module (3) is transferable by removing it from the specific operating position (BL).

9 Claims, 11 Drawing Sheets

(51) Int. Cl.
    *B65B 35/44*         (2006.01)
    *B65B 59/00*         (2006.01)

(58) Field of Classification Search
    CPC .. B65G 41/001; B65G 41/003; B65G 41/005; B65G 21/20–14; B65B 35/24; B65B 35/44; B65B 59/003; B65B 59/005; B65B 21/245
    USPC ....... 53/147, 443, 48.1–48.9; 198/607, 861.1
    See application file for complete search history.

(56) References Cited

U.S. PATENT DOCUMENTS

| | | | | |
|---|---|---|---|---|
| 5,638,659 | A * | 6/1997 | Moncrief | B65B 59/02 53/448 |
| 5,966,901 | A * | 10/1999 | Komp | B65B 59/003 53/387.2 |
| 6,227,377 | B1 * | 5/2001 | Bonnet | B65G 21/12 198/435 |
| 6,484,475 | B1 | 11/2002 | Neagle et al. | |
| 7,150,383 | B2 * | 12/2006 | Talken | B26D 7/32 225/93 |
| 7,650,729 | B2 * | 1/2010 | Whittlesey | A22C 11/02 53/138.2 |
| 8,966,864 | B2 * | 3/2015 | Rabec | B65B 59/003 53/210 |
| 9,637,314 | B2 | 5/2017 | Werner et al. | |
| 2013/0220772 | A1 * | 8/2013 | Vasse | B65G 47/841 198/431 |
| 2013/0220774 | A1 * | 8/2013 | Werner | E04C 2/12 198/583 |
| 2013/0333337 | A1 * | 12/2013 | Gosset | B65G 47/82 53/531 |
| 2016/0107782 | A1 | 4/2016 | Huffer et al. | |
| 2016/0362254 | A1 | 12/2016 | Papsdorf et al. | |

FOREIGN PATENT DOCUMENTS

| | | |
|---|---|---|
| DE | 202010018316 | 9/2015 |
| WO | 2010096111 A1 | 8/2010 |

* cited by examiner

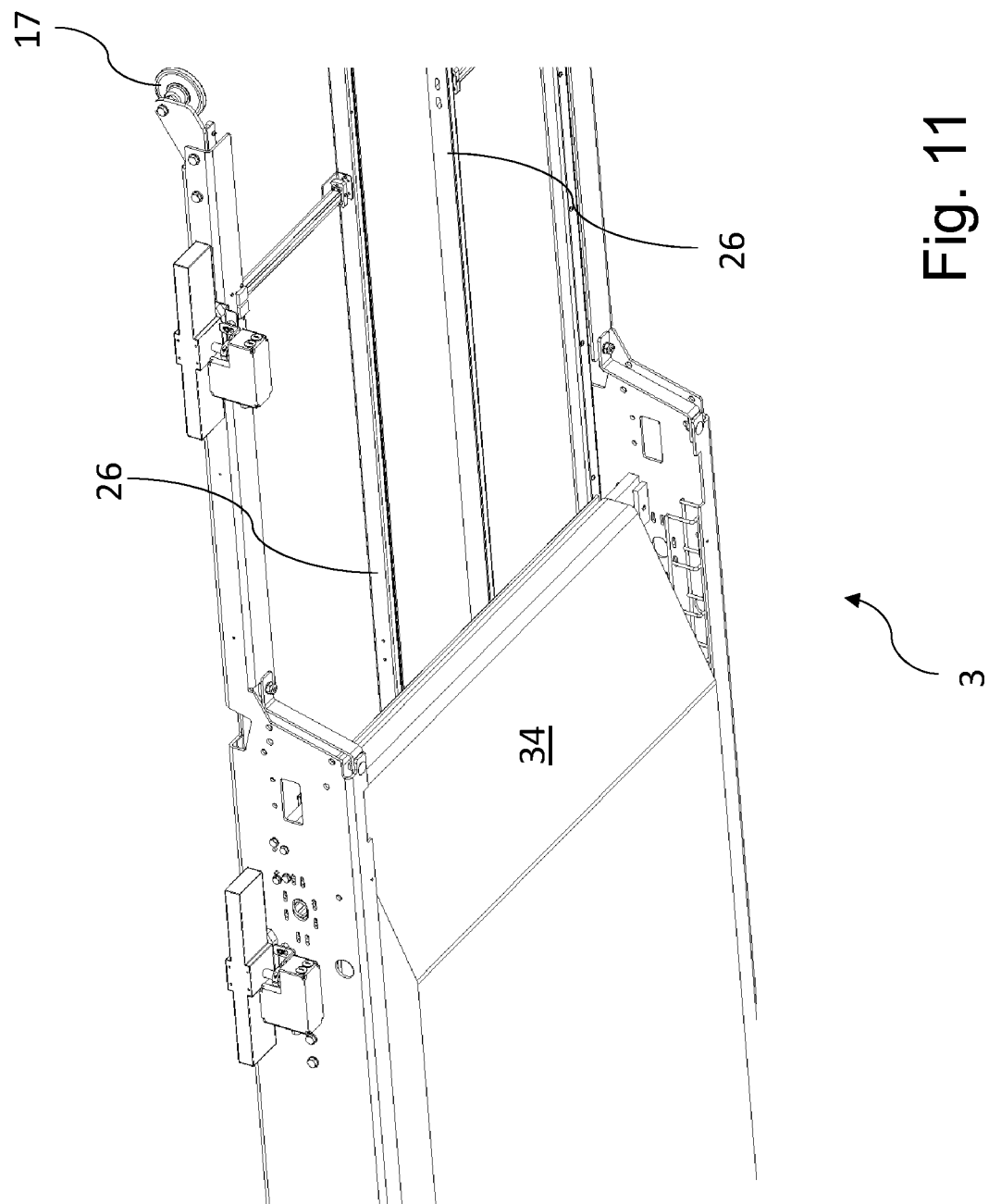

APPARATUS FOR HANDLING ARTICLES AS WELL AS METHOD FOR EXCHANGING AT LEAST ONE TRANSPORT MODULE AND AT LEAST ONE WORK MODULE OF THE APPARATUS

CLAIM OF PRIORITY

The present application claim priority to German Application DE 10 2017 203 588.9, filed Mar. 6, 2017, which is incorporated by reference.

FIELD OF THE INVENTION

The present invention relates to an apparatus with at least two modules that are selectively transferable into an operating position for the particular handling of individual articles or article sets. The present invention furthermore relates to a method for exchanging at least one transport module and at least one work module for a specific operating position.

BACKGROUND OF THE INVENTION

There is a wide variety of packaging alternatives for processing, assembling, grouping, and packaging articles, such as beverage containers. PET containers are currently the most commonly used type of containers, for instance for beverages, but they are relatively thin-walled and, even when filled, not completely dimensionally stable. For this reason and for the purpose of improved logistic handling, a wide variety of different packages are used for processing and/or packaging grouped individual containers. It is possible to place the containers when they are arranged in a group onto a box blank, for instance, the edges of which are folded upward. It is also possible to use cardboard blanks corresponding in size at least to the base size of an arranged package, on which blanks the individual containers or beverage containers stand, which form a part of a particular package or bundle.

Optionally, these bundle arrangements can be subsequently wrapped in thermoplastic film, which is then applied by a heat shrinking process onto the beverage containers forming a part of a particular bundle, in order to obtain a stable bundle assembly that can be easily transported and stacked. A further packaging variant is referred to as "shrink-only packaging", because the assembled containers are wrapped in thermoplastic film and the thermoplastic film is subsequently shrunk onto the particular assembled containers without using any other packaging material or any other blanks In such a package variant, the dimensional stability of the package is ensured solely by the shrinking foil. Currently known packaging machines and their conveying devices are normally specifically optimized to a certain type, size, and/or contour of conveyed goods. Different types of bundles or different packaging alternatives moreover require the use of different, specific conveying devices. In some circumstances, such as changes of products, it is therefore possible that the use of certain conveying devices cannot be continued if these devices are not suited to transporting the specific, currently required type of individual articles or containers. Disturbances in the article transporting process can also occur if the packaging machines are specifically adjusted to transporting a different product variant. Conveying problems such as these may particularly arise when there are changes from packed goods, such as bundle units, to loose goods, such as individual beverage containers or the like. Such articles as beverage containers, which are to be conveyed in a standing position, are prone to toppling over and/or falling down when using conveying devices that are adapted for transporting bundle units, especially if the transport modules are not equipped with conveyor support surfaces that are sufficiently flat and level to safely transport objects with a very small base size.

Apparatuses are already known from prior art that serve to prevent such problems by comprising a plurality of modules, which can be exchangeably or selectively inserted into a specific section of a transport path. Such an apparatus is disclosed in WO 2012/062549 A1, for example. The apparatus described in the document relates to a machine for processing and/or packaging objects, the machine having a substantially horizontal transport path for conveying articles, bundles and/or packaging units. The machine comprises a first horizontal conveying device with at least one transport means for a first operating mode, which horizontal conveying device can be replaced by a further horizontal conveying device with at least one second transport means that is different from the first transport means, in order to establish at least one further operating mode.

Practice has shown that such a process of replacing horizontal conveying devices to adapt the machine to different operating modes requires a certain amount of time that should be kept as short as possible in order to be able to quickly convert such a machine to different operating modes.

SUMMARY OF THE INVENTION

One object of the invention can therefore be seen in providing a generic apparatus or a corresponding method, as the case may be, where the apparatus can be converted or adapted to different operating modes in a time-optimized manner. In addition, the apparatus should have a simple structure, and the method should be easy to carry out.

The above objects are fulfilled by an apparatus and a method comprising the features in the independent claims. Further advantageous embodiments of the invention are described in the subclaims.

The invention relates to an apparatus with at least two modules that are selectively transferable into an operating position for the particular handling of individual articles or article sets.

The apparatus comprises at least one transport module that is prepared for moving individual articles or article sets, which are provided for a first packaging type.

The apparatus further comprises at least one work module that is prepared for moving individual articles or article sets, which are provided for a second packaging type that differs from the first packaging type. The at least one work module is moreover able to handle packaging material with which the individual articles or article sets are in contact during the movement. In particular, it can be provided in this context that the at least one work module is formed for erecting flaps of blanks that are formed as packaging material and provided for the individual articles or article sets. The at least one work module can comprise a multitude of circumferentially guided folding fingers for erecting the flaps. The circumferentially guided folding fingers can emerge above a transport level or conveying level formed by the apparatus for the purpose of transporting the individual articles or article sets; and in doing so, the folding fingers can come into contact with a particular flap, as the case may be, and, while emerging, can move the particular flap above the transport level or conveying level into an erect orientation. In particular, the work module can be formed for holding the erected flaps of the blanks formed as packaging material and provided for the individual articles or article sets over a specific period of time during a continuing movement of the particular individual articles or the particular article set. For the circulating movement, the multitude of folding fingers can be mechanically coupled to at least one chain or sealing chain, as the case may be.

It is moreover provided that the apparatus forms a specific operating position and a waiting position, into which specific operating position the at least one transport module or the at least one work module can be selectively inserted, and into which waiting position the at least one transport module is transferable by removing it from the specific operating position. The waiting position can be offset in horizontal and also in vertical direction in relation to the specific operating position. It is thus possible that the at least one transport module is moved in horizontal direction and in vertical direction for being inserted from the waiting position into the specific operating position. Thus, it is conceivable that the at least one transport module is moved in horizontal direction and in vertical direction or is moved in horizontal direction and lifted up in vertical direction, as the case may be, for being transferred from the specific operating position into the waiting position. The waiting position provided for the at least one transport module can therefore be located at a vertically higher level in relation to the specific operating position.

It is furthermore provided that the apparatus comprises at least one transmission means that is made from a plurality of individual links rotationally movably linked to each other, which transmission means is mechanically coupled to the at least one transport module and interacts with the at least one transport module in the specific operating position for the purpose of moving the individual articles or article sets, and which transmission means can flexibly adapt its alignment along its circumferential course in each instance with a change of the at least one transport module from the specific operating position into the waiting position and from the waiting position into the specific operating position. In particular, the at least one transport module can be mechanically coupled via at least one pulley to the at least one transmission means that is made from a plurality of individual links rotationally movably linked to each other. The at least one pulley can be in engagement with the transmission means that is made from a plurality of individual links rotationally movably linked to each other. In this context it is conceivable that the at least one pulley forms gear teeth, via which gear teeth at least one pulley is in engagement with the transmission means that is made from a plurality of individual links rotationally movably linked to each other. Embodiments have proved successful in practice where the at least one transport module comprises at least two pulleys, each of which is in engagement with a common transmission means that is made from a plurality of individual links rotationally movably linked to each other.

In preferred embodiments, the apparatus can comprise a working mechanism, by way of which working mechanism the at least one transport module can be independently removed from the specific operating position and transferred into the waiting position, and it can as well be independently inserted from the waiting position into the specific operating position. As already mentioned above, it is conceivable that the at least one transport module is in each instance moved horizontally and vertically for being transferred into the waiting position as well as for being inserted into the specific operating position. Where required, the working mechanism can for this reason cause a horizontal movement as well as a vertical movement for the at least one transport module.

Alternatively or additionally, it is possible that by way of the working mechanism the at least one work module can be independently transferred from the specific operating position into a further waiting position provided for the second work module, and that by way of the working mechanism the at least one work module can as well be independently inserted from the further waiting position provided for the at least one work module into the specific operating position. In particular, the further waiting position provided for the at least one work module can be positioned below a conveying level or transport level, as the case may be, formed for the individual articles or article sets by the apparatus. In this context it is possible that the at least one work module is independently lowerable by way of the working mechanism below the conveying level or transport level, as the case may be, formed for the individual articles or article sets by the apparatus.

As mentioned, it is possible that the apparatus forms a horizontal movement plane or conveying level and/or transport level, as the case may be, for the individual articles or article sets, with the waiting position, into which the at least one transport module is transferable from the specific operating position, being positioned or disposed, as the case may be, above the horizontal movement plane or conveying level and/or transport level, as the case may be, and/or with a waiting position formed for the at least one work module being positioned or disposed, as the case may be, below the horizontal movement plane or transport level and/or conveying level, as the case may be.

It is also conceivable that at least one transport module comprises a horizontal transport surface and that a multitude of circumferentially guided transport elements is coupled to the at least one transmission means that is made from a plurality of individual links rotationally movably linked to each other. The multitude of circumferentially guided transport elements can be formed for the sliding movement of the individual articles or article sets across the horizontal transport surface of the at least one transport module that is inserted in the specific operating position. The multitude of circumferentially guided transport elements can be formed by a multitude of divider rods, which push the particular individual articles or article sets along the horizontal transport surface. The horizontal transport surface can be formed by a transfer plate being supplied as part of the transport module In particular, at least one pair of transmission means that are each made from a plurality of individual links rotationally movably linked to each other can be provided, with a particular transport element of the multitude of transport elements or with a particular divider rod of the multitude of divider rods, as the case may be, being mechanically coupled to and being moved in a circulating manner via the pair of transmission means that each consist of a plurality of individual links rotationally movably linked to each other.

It is also possible that the at least one transport module comprises at least two guide walls located opposite each other, and that the relative distance of the at least two guide walls located opposite each other can be adapted for the purpose of presetting at least one specific transport lane for the individual articles or article sets, with the transport lane extending along the horizontal transport surface. For the purpose of adapting the relative distance, the at least two guide walls located opposite each other can be coupled to at least one actuator, as the case may be, with the actuator being in contact with a control unit, and with a relative distance of the at least two guide walls located opposite each other being adaptable by way of the actuator and prompted by the control unit.

In various embodiments, it is possible that the waiting position, into which the at least one transport module is transferable form the specific operating position, is formed such that the horizontal transport surface or transfer plate of the at least one transport module, as the case may be, is, when in the waiting position, located above a horizontal conveying level or above a horizontal movement plane and/or horizontal transport level, as the case may be, that is formed for moving the articles or article sets by the apparatus. In addition, the waiting position can be formed such that the multitude of transport elements or divider rods, as the case may be, can move and/or accompany the individual articles or article sets, if applicable, at least in sections along the horizontal conveying level, with the transport elements or divider rods, as the case may be, in contact preferably with the rear ends of the individual articles or article sets.

As already mentioned, the at least one work module that is inserted in the specific operating position can comprise a plurality of circumferentially guided folding fingers, by way of which plurality of circumferentially guided folding fingers flaps belonging to packaging blanks in contact with the individual articles or with the article sets can be erected during the movement of the particular individual articles or article sets.

If applicable, the apparatus can moreover comprise at least one guide member that is preferably formed as deflection member for the at least one transmission means that is made from a plurality of individual links rotationally movably linked to each other, with the at least one guide member that is preferably formed as deflection member being able, for the purpose of acting upon the alignment along the circumferential course of the transmission means that is made from a plurality of individual links rotationally movably linked to each other, to assume at least two different positions that are coordinated to a change of the at least one transport module from the specific operating position into the waiting position and from the waiting position into the specific operating position. It is conceivable in this context that the apparatus comprises at least one actuator, via which the guide member that is preferably formed as deflection member can be moved for the change from a first position into a second position. The first position can be offset in horizontal and/or in vertical direction in relation to the second position. In particular, a first specified position for the waiting position can be assigned to the at least one transport module and a second specified position can be assigned for the specific operating position, with the first specified position and the second specified position, if applicable, being offset in horizontal and/or in vertical direction in relation to each other, and with a movement of the guide member that is preferably formed as deflection member being caused by way of the actuator.

The present invention moreover relates to a method for exchanging at least one transport module and at least one work module for an operating position. Features that have already been described above regarding various embodiments of the apparatus can likewise be provided for various embodiments of the method according to the invention and are therefore not repeatedly mentioned. Features, which will be described below regarding various embodiments of the method, can likewise be used for the previously already described apparatus, where applicable.

It is provided that individual articles or article sets, which are provided for a first packaging type, are moved along the at least one transport module in the operating position. The individual articles can be formed by individual beverage containers. Furthermore, the article sets can be formed by sets of beverage containers. It is furthermore provided that the at least one work module in the operating position moves individual articles or article sets, which are provided for a particular second packaging type that differs from the first packaging type, and which at least one work module in the operating position handles packaging material temporally during the movement of the individual articles or article sets, the packaging material being in contact with the individual articles or article sets. It is thus possible that individual articles or article sets are moved by the at least one work module inserted in the operating position, with the at least one work module inserted in the operating position temporally handling packaging material during the movement of the individual articles or article sets, with which packaging material the individual articles or article sets are in contact while being moved by the at least one work module.

One step of the method provides the at least one transport module inserted in the specific operating position to be removed from the specific operating position, the at least one transport module to be transferred into a waiting position, and the at least one work module to be inserted into the specific operating position.

Temporally thereafter follows a further step, which provides removing the at least one work module that is inserted in the specific operating position from the specific operating position and inserting the at least one transport module that is located in the waiting position into the specific operating position. The at least one transport module and the at least one work module for the specific operating position can thus be exchanged.

For the purpose of moving the individual articles or article sets, it is also provided that the at least one transport module that is inserted in the specific operating position interacts with at least one transmission means that is made from a plurality of individual links rotationally movably linked to each other. The transmission means that is made from a plurality of individual links rotationally movably linked to each other can be formed by at least one chain.

It is additionally provided that, temporally while removing the at least one transport module from the specific operating position and temporally while inserting the at least one transport module from the waiting position into the specific operating position, a mechanical connection is maintained, the mechanical connection being formed between the at least one transmission means that is made from a plurality of individual links rotationally movably linked to each other and the at least one transport module; and the at least one transmission means that is made from a plurality of individual links rotationally movably linked to each other flexibly adapts its alignment along its circumferential course.

In the course of or during the flexible adaptation, as the case may be, individual links of the transmission means that is made from a plurality of individual links rotationally movably linked to each other can pivot relative to each other.

In various embodiments it is possible that the at least one transport module that is inserted in the specific operating position is independently removed from the specific operating position and transferred into the waiting position by way of a working mechanism. It is furthermore possible that the at least one work module is independently inserted into the specific operating position by way of the working mechanism. It is, in particular, conceivable that the at least one work module is independently lifted up by way of the working mechanism for being inserted into the specific operating position. It is also possible that the at least one transport module that is inserted in the specific operating position is lifted up from the specific operation position for being transferred into the waiting position.

Additionally or alternatively to this, it is possible that the at least one work module that is inserted in the specific operating position is independently removed by way of a working mechanism from the specific operating position, and that the at least one transport module that is located in the waiting position is independently inserted by way of the working mechanism into the specific operating position. In this context, embodiments have proved particularly successful in which the at least one work module that is inserted in the specific operating position is lowered downward by way of the working mechanism for the purpose of being removed, and is transferred into a waiting position provided for the at least one work module. It is also possible that the at least one transport module located in the waiting position is lowered downward for being inserted into the specific operating position.

It is thus possible that at least one transport module that is inserted in the specific operating position is lifted upward while being removed from the specific operating position and in this context passes on into the waiting position, the waiting position being disposed above a horizontal movement plane formed for the individual articles or article sets. It is thus also possible that the at least one work module that is inserted in the specific operating position is lowered downward while being removed from the specific operating position and in this context passes on into a waiting position provided for the at least one work module, with the waiting position provided for the at least one work module being disposed below a horizontal movement plane formed for the individual articles or article sets.

In preferred embodiments, the transmission means that is made from a plurality of individual links rotationally movably linked to each other can circumferentially drive a multitude of transport elements, the multitude of transport elements moving the individual articles or article sets, in a sliding manner and preferably in each instance in contact with the rear ends of the individual articles or article sets, across a horizontal transport surface or across a horizontal transfer plate, as the case may be, that is formed as a part of the at least one transport module that is inserted in the specific operating position.

It is furthermore possible that the at least one specific transport module is removed from the specific operating position and is transferred into the waiting position, and in this context, temporally after transfer of the at least one transport module into the waiting position, the multitude of transport elements moves individual articles or article sets along a horizontal movement plane or along a horizontal conveying level, as the case may be, with the transport elements in contact preferably with the rear ends of the individual articles or article sets, and/or the multitude of transport elements accompanies individual articles or article sets along a horizontal conveying level, with the transport elements in contact preferably with the rear ends of the individual articles or article sets. In practice, embodiments have proved successful for this purpose in which the at least one work module that is inserted in the specific operating position is disposed immediately upstream of an infeed, and the multitude of transport elements moves the individual articles or article sets along the infeed, with the transport elements in contact preferably with the rear ends of the individual articles or article sets. Immediately before and/or while the individual articles or article sets pass over from the infeed onto the at least one work module that is inserted in the specific operating position, individual transport elements of the multitude of transport elements can lose their contact to the particular individual article or to the particular article set. Via the at least one transmission means that is made from a plurality of individual links rotationally movably linked to each other, the individual transport elements of the multitude of transport elements can in this context be upwardly removed or guided away, as the case may be, from the particular individual article or from the particular article set, as the case may be.

In addition, the at least one work module that is inserted in the specific operating position can, by way of a plurality of circumferentially guided folding fingers, erect flaps belonging to packaging blanks in contact with the individual articles or with the article sets, and can move the individual articles or article sets by way of the circumferentially guided folding fingers while the flaps are being erected. In this context it is conceivable that, during the movement by way of the plurality of circumferentially guided folding fingers, the individual articles or article sets are at least temporarily accompanied by a particular transport element, which is in contact preferably with the rear ends of the individual articles or article sets.

In various embodiments of the method, a guide member that is preferably formed as deflection member for the at least one transmission means that is made from a plurality of individual links rotationally movably linked to each other can be furthermore provided, with a position of the at least one guide member that is preferably formed as deflection member being in each instance adjusted in the context of a change of the at least one transport module from the specific operating position into the waiting position and from the waiting position into the specific operating position, for the purpose of acting upon the alignment along the circumferential course of the transmission means that is made from a plurality of individual links rotationally movably linked to each other. For the purpose of the adjustment, the guide member that is preferably formed as deflection member can be moved in vertical direction and/or in horizontal direction.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 11 shows a schematic perspective view from below onto the transport module from FIGS. 9 and 10.

DETAILED DESCRIPTION OF THE INVENTION

Figure 1:
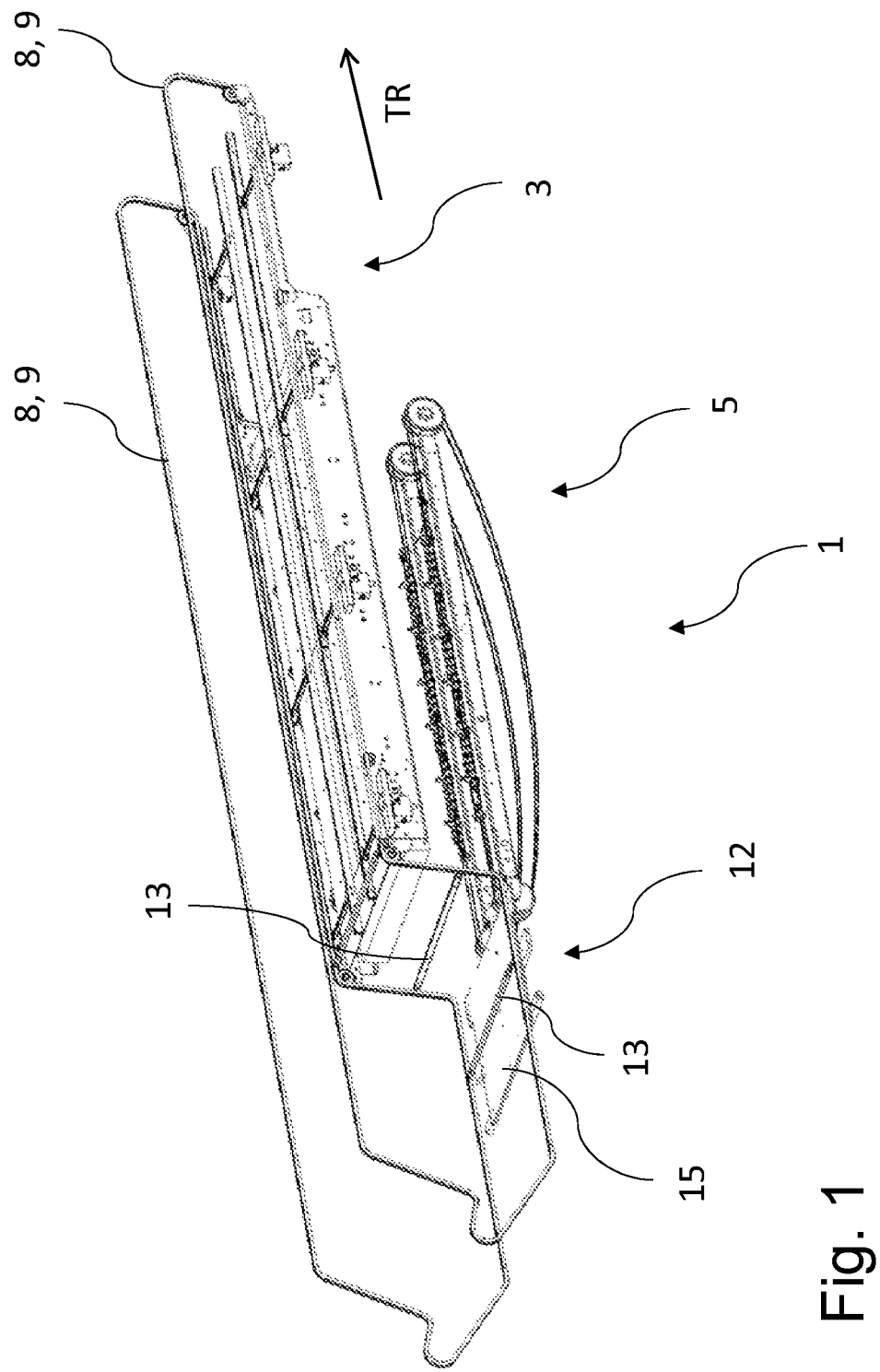
FIG. 1 shows a schematic perspective view of an embodiment of an apparatus according to the invention.

The same or equivalent elements of the invention are designated using identical reference characters. Furthermore and for the sake of clarity, only the reference characters relevant for describing the individual figures are provided. It should be understood that the detailed description and specific examples, while indicating a preferred embodiment, are intended for purposes of illustration only and are not intended to limit the scope of the invention. It should also be noted that the features described below in connection with the FIGS. 1 to 11 are not intended to be restricted to the particular exemplary embodiment, but can be used in the general context.

FIG. 1 shows a schematic perspective view of an embodiment of an apparatus 1 according to the invention. The apparatus 1 is designed for packaging article sets of articles, which take the form of beverage containers, and which, for the purpose of clarity, are not illustrated in the figures of the present patent application. It is therefore possible by the apparatus 1 to apply a packaging material that is designed as a blank to a particular set of beverage containers. In particular, the apparatus 1 from FIG. 1 is designed for placing a particular set of beverage containers onto a blank of packaging material formed as tray or pad during a continuous or uninterrupted movement, as the case may be, of the particular set of beverage containers.

Figure 3:
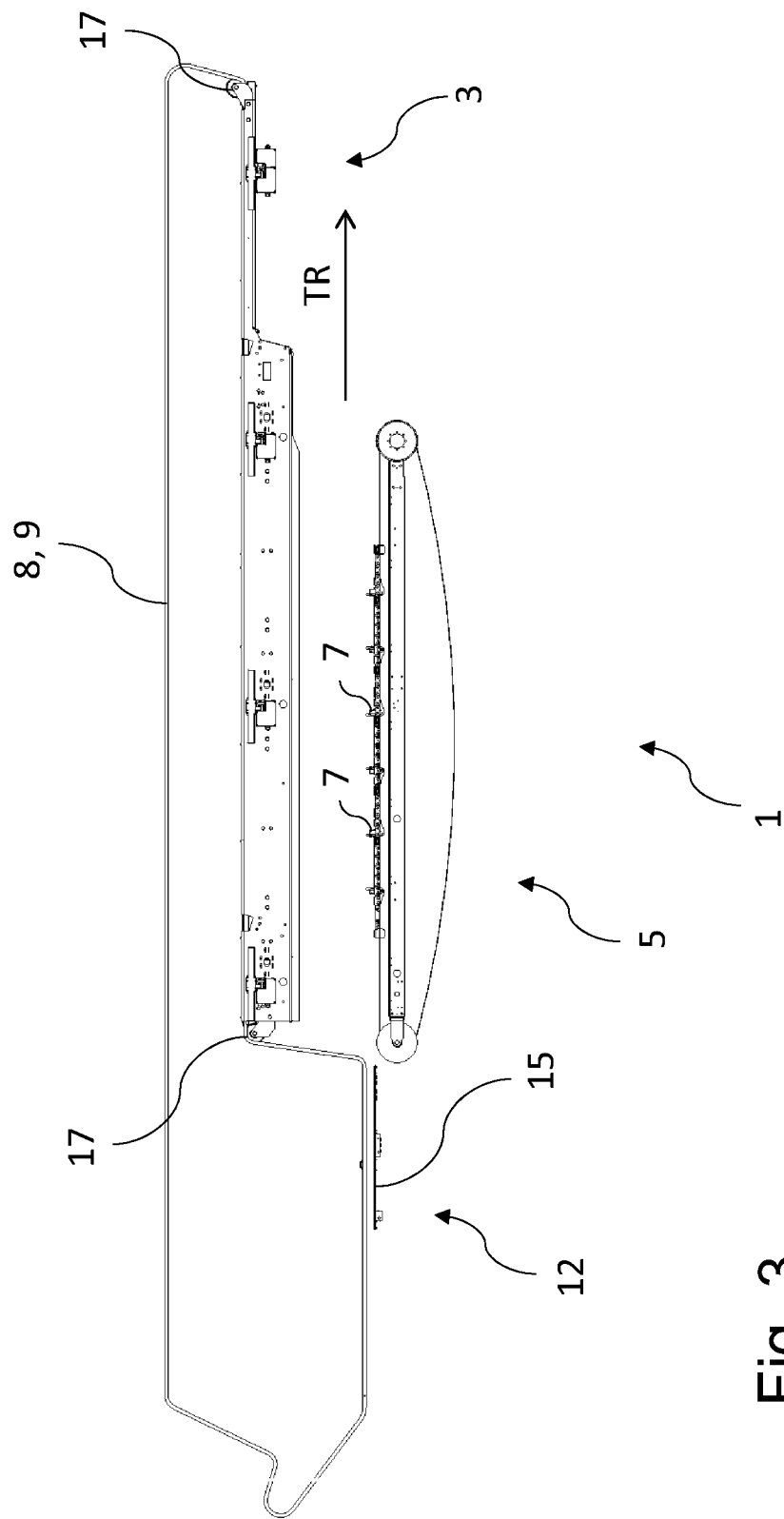
FIG. 3 shows a schematic side view of the embodiment of the apparatus from the FIGS. 1 and 2.

The apparatus 1 comprises a work module 5, which is located in an operating position in FIG. 1, by way of which work module 5 article sets can be moved, and which work module 5 can erect front and back flaps of trays assigned to a particular set of beverage containers by way of a multitude of circumferentially guided folding fingers 7 (cf. FIG. 3).

Two transmission means 8 oriented parallel to each other and each made from a plurality of individual links rotationally movably linked to each other take the form of a chain 9. A multitude of divider rods 13 is mechanically coupled to the transmission means 8 or chains 9, as the case may be, the divider rods 13 being circumferentially moved via the transmission means 8 or chains 9, as the case may be. In the area of an infeed 12, the divider rods 13 in this context come into surface contact with the rear end of a particular set of beverage containers and then push the particular set of beverage containers across the slide plate 15 toward the work module 5, which is in the operating position. When a particular set of beverage containers passes over from the slide plate 15 onto the work module 5, the particular divider rod 13 leaves the particular set of beverage containers in an upward direction. When passing over from the slide plate 15 onto the work module 5, the particular set of beverage containers furthermore moves onto a particular blank of packaging material, which is formed as tray in the instance of the work module 5 that is in the operating position. As already mentioned above, the blank of packaging material has front and back flaps that are folded upward during a continuous or uninterrupted transport, as the case may be, of the particular set of beverage containers standing upon the blank of packaging material or on the tray, as the case may be, by way of a multitude of folding fingers 7 (cf. FIG. 3) formed as a part of the work module 5. FIG. 1 thus illustrates that the sets of beverage containers can be moved by way of the divider rods 13 that are being circumferentially moved by way of the transmission means 8 or by way of the chain 9, as the case may be, when the work module 5 is in the specific operating position or when the work module 5 has been transferred into the specific operating position. The movement of the sets of beverage containers by way of the divider rods 13 is in this context limited to the area of the infeed 12.

For the sake of completeness, it should be noted that it is not imperative for the divider rods 13 to leave a particular set of beverage containers when it passes over from the slide plate 15 onto the work module 5. It is also conceivable that the divider rods 13 continue to accompany the sets of beverage containers after they have passed over onto the work module 5 or, as the case may be, that the divider rods 13 continue to remain in contact with the rear end of at least one beverage container of a particular set, where applicable. At the same time, erected front and back flaps of a blank of packaging material assigned to a particular set of beverage containers can be held in an erect orientation by way of the folding fingers 7.

A transport module that is exemplarily designated with the reference character 3 is moreover part of the apparatus 1. The transmission means 8 made from a plurality of individual links rotationally movably linked to each other or the chain 9, as the case may be, is mechanically coupled to the transport module 3. Furthermore, the transport module 3 in FIG. 1 is in a waiting position, in which the transport module 3 for moving the sets of beverage containers is not operating.

A further waiting position is also indicated, which further waiting position is below a transport level or conveying level, as the case may be, formed for the sets of beverage containers. In the further waiting position, the work module 5 can change from the specific operating position according to FIG. 1, as will be described below. The transport module 3 can also change from the waiting position, as will be described below, into the specific operating position, or it can be inserted into the specific operating position inserted, as the case may be. At least one actuator is operated via the control unit for a change of the work module 5 from the specific operating position into the further waiting position and vice versa, as well as for a change of the transport module 3 from the waiting position into the specific operating position and vice versa. Each instance of changing or inserting, as the case may be, the work module 5 or the transport module 3, as the case may be, from the waiting position or from the further waiting position, as the case may be, into the specific operating position, as well as each instance of changing the work module 5 or the transport module 3, as the case may be, from the specific operating position into the waiting position or into the further waiting position, as the case may be, is therefore carried out automatically prompted by the control unit with the help of at least one actuator, the actuator being in contact with the transport module 3 and the work module 5 or being coupled to the transport module 3 and the work module 5, as the case may be.

Figure 2:
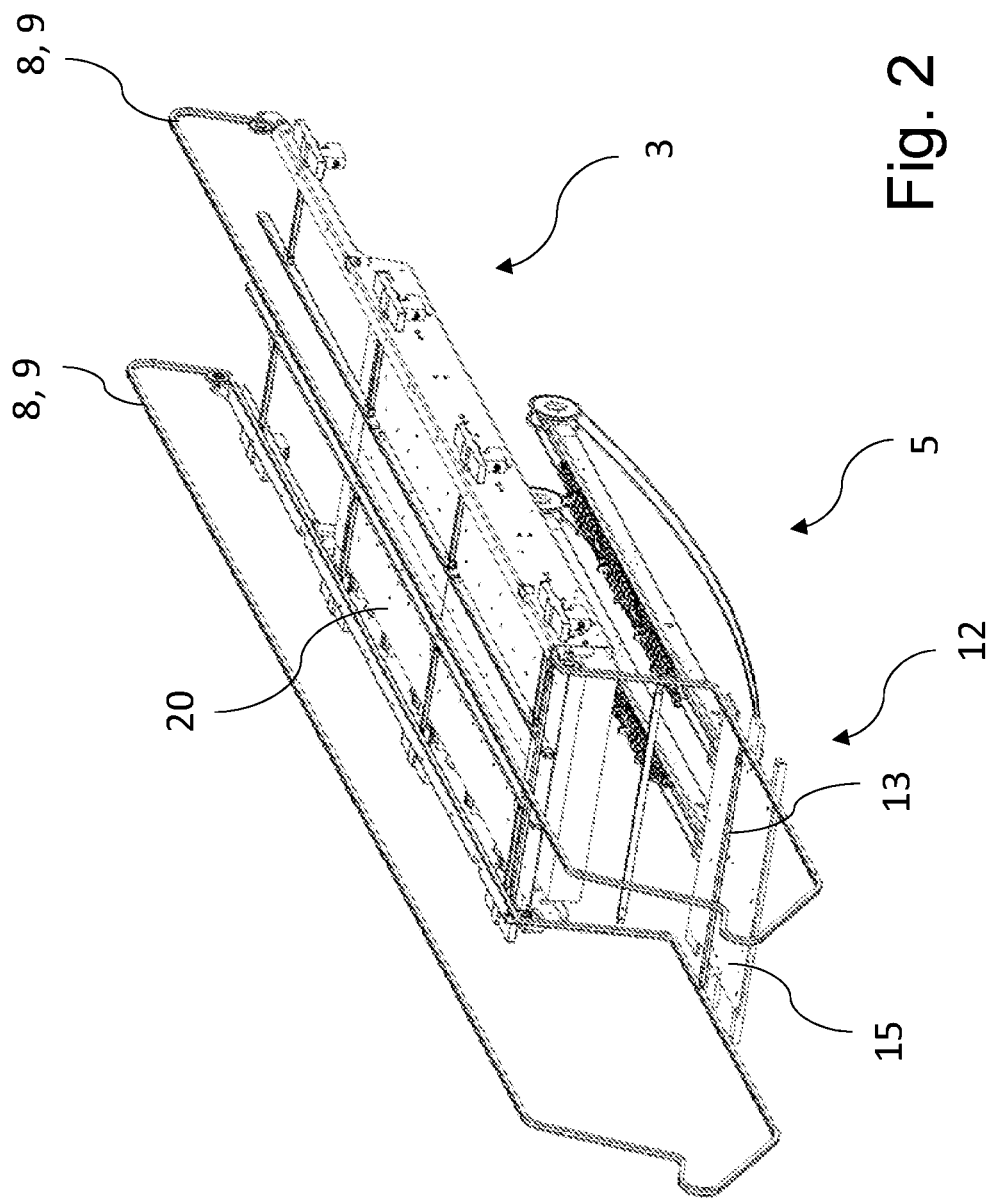
FIG. 2 shows a further schematic perspective view of the embodiment of the apparatus from FIG. 1.

FIG. 2 shows a further schematic perspective view of the embodiment from FIG. 1 of an apparatus 1 according to the invention. The parallel alignment of the transmission means 8 that are made from a plurality of individual links rotationally movably linked to each other or the parallel alignment of the chains 9, as the case may be, is again discernible in FIG. 2. Furthermore, the transport module 3 in FIG. 2 is in the waiting position, whereas the work module 5 is disposed in the operating position.

FIG. 2 moreover shows a transfer plate 20 formed as part of the transport module 3 After the work module 5 has changed into the further waiting position and after the transport module 3 has been transferred into the operating position, the sets of beverage containers can be pushed along the transfer plate 20 of the transport module 3 by the divider rods 13. When the transport module 3 is in the waiting position, the transfer plate 20 is disposed above a transport level or conveying level, as the case may be, formed for the sets of beverage containers such that in this context it is not provided that the sets of beverage containers move in surface contact with the transfer plate 20.

The transmission means 8 that is made from a plurality of individual links rotationally movably linked to each other or the chain 9, as the case may be, is thus mechanically coupled to the transport module 3, which mechanical coupling is formed both in the waiting position and in the operating position, and continues to remain formed during the transfer of the transport module 3 from the waiting position into the specific operating position and vice versa.

FIG. 3 shows a schematic side view of the embodiment of the apparatus 1 from the FIGS. 1 and 2. The transport module 3 continues to be disposed in the waiting position, whereas the work module 5 continues to be located in the specific operating position.

The plurality of circumferentially guided folding fingers 7 formed as part of the work module 5 is now discernible in FIG. 3, which folding fingers 7 erect front and back flaps of a particular planar packaging blank during a continuing movement of the particular set of beverage containers standing on the planar packaging blank.

In each instance of passing over from the infeed 12 or from the slide plate 15 onto the work module 5, a particular set of articles or of beverage containers, as the case may be, moves onto a particular blank. Each set of beverage containers is pushed with their rear ends in contact with a particular divider rod 13 (cf. FIGS. 1 and 2) across the infeed 12 or across the slide plate 15, as the case may be, until the particular set of beverage containers passes over onto the work module 5. After the set of beverages containers has passed over onto the work module 5, the circumferentially guided folding fingers 7 move the particular set of beverage containers together with their particular planar packaging blank or tray, as the case may be, and hold the erected flaps in an erected orientation during a movement along the work module 5. In practice, it is possible to apply an adhesive bond onto the particular planar packaging blank or onto the particular tray, as the case may be, temporally prior to erecting the front and back flaps so that the front and back flap of a particular planar packaging blank or of a particular tray, as the case may be, are fixed in a material-bonding manner after erecting.

From the presentation in FIG. 3 moreover follows that the article sets or sets of beverage containers, as the case may be, retain their horizontal level or, as the case may be, are neither lifted up in vertical direction nor lowered in vertical direction, in the course of their movement across the infeed 12 as well as across the work module 5 that is inserted in the operating position and is disposed subsequent to the infeed 12. The infeed 12 or the slide plate 15, as the case may be, and the work module 5 thus in each instance form a horizontal conveying level for sets of beverage containers, where the horizontal conveying level for sets of beverage containers formed by way of the infeed 12 or by way of the slide plate 15, as the case may be, and the horizontal conveying level for sets of beverage containers formed by way of the work module 5 are at an at least approximately identical vertical height level. The circulating movement of the folding fingers 7 formed as part of the work module 5 that is in the specific operating position and the circulating movement of the transmission means 8 or of the chain 9, as the case may be, are coordinated to each other by way of the control unit.

Figure 4:
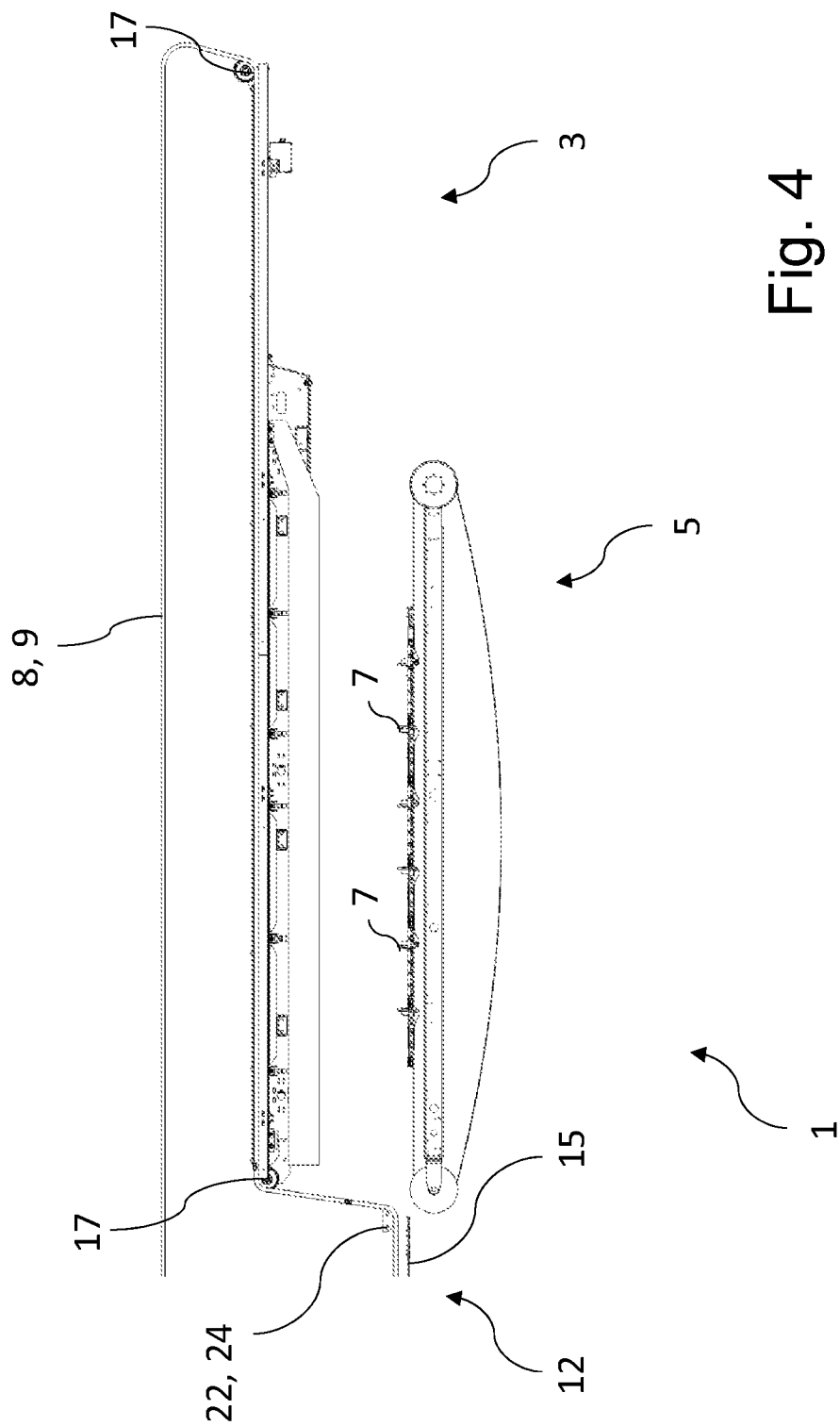
FIG. 4 shows a further schematic side view of the apparatus from the FIGS. 1 to 3 with further aspects being illustrated.

FIG. 4 shows a further schematic side view of the apparatus 1 from the FIGS. 1 to 3 with further aspects being illustrated. In particular, FIG. 4 shows further details of the illustration in FIG. 3. Discernible in FIG. 4 in addition to the individual aspects from FIG. 3 is a guide member 22 for the transmission means 8 that is made from a plurality of individual links rotationally movably linked to each other or for the chain 9, as the case may be. The guide member 22 is formed as deflection member 24 and is mechanically in engagement with the transmission means 8 or with the chain 9, as the case may be.

Figure 6:
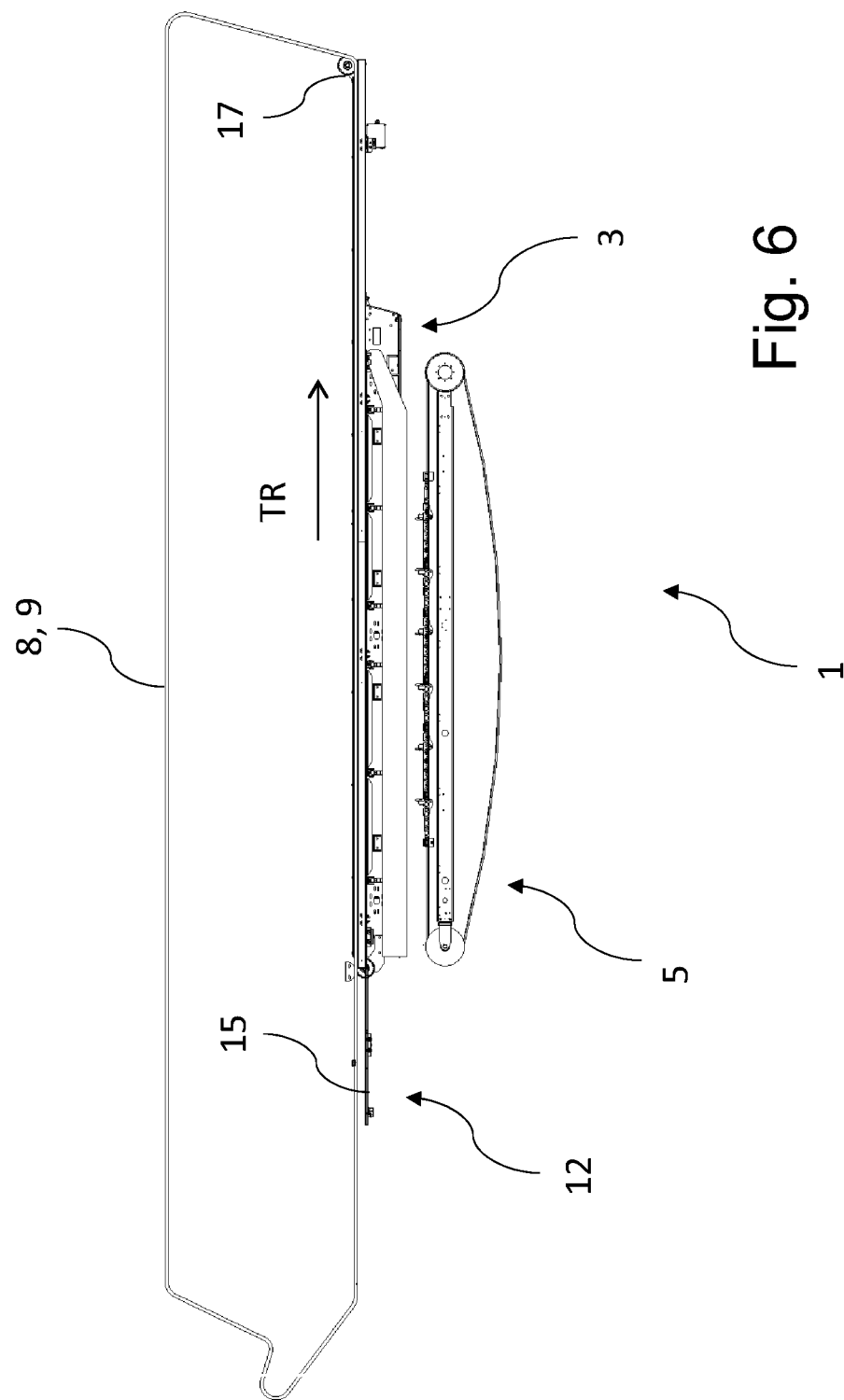
FIG. 6 shows a further schematic side view of the embodiment of the apparatus from the FIGS. 1 to 5, with the transport module in the specific operating position.

FIGS. 4 and 6 in conjunction illustrate that the transport module 3 can change from the waiting position into the operating position or, as the case may be, can be transferred from the waiting position into the operating position. The transmission means 8 made from a plurality of individual links rotationally movably linked to each other or the chain 9, as the case may be, is mechanically coupled to the transport module 3. In the course of a change of the transport module 3 from the waiting position into the specific operating position and from the specific operating position into the waiting position, the transport module 3 retains its mechanical connection to the transmission means 8 that is made from a plurality of individual links rotationally movably linked to each other or to the chain 9, as the case may be. FIGS. 4 and 6 in conjunction illustrate in particular that a circumferential course of the transmission means 8 that is made from a plurality of individual links rotationally movably linked to each other or of the chain 9, as the case may be, can flexibly adapt in each instance in the transfer from the specific operating position into the waiting position and in the insertion from the waiting position into the specific operating position.

The guide member 22 or the deflection member 24, as the case may be, as exemplarily illustrated in FIG. 4 can be position-adjusted while the transport module 3 is inserted into the specific operating position and while the transport module 3 is transferred from the specific operating position into the waiting position, with the position adjustment being prompted by the control unit with the help of an actuator that is coupled to the control unit; and the guide member 22 or deflection member 24, as the case may be, can in this context act upon the circumferential course of the transmission means 8 that is made from a plurality of individual links rotationally movably linked to each other or upon the circumferential course of the chain 9, as the case may be. In the exemplary embodiment from FIG. 4, the guide member 22 or the deflection member 24, as the case may be, is assigned a first specified position assumed by the guide member 22 or the deflection member 24, as the case may be, when the transport module 3 is inserted in the specific operating position, as well as being assigned a further specified position assumed by the guide member 22 or the deflection member 24, as the case may be, when the transport module 3 has been transferred into the waiting position. The specified position and the further specified position are offset in horizontal direction in relation to each other. Prompted by the control unit, the guide member 22 or the deflection member 24, as the case may be, can thus be moved in horizontal direction for the purpose of acting upon the circumferential course of the transmission means 8 that is made from a plurality of individual links rotationally movably linked to each other or upon the circumferential course of the chain 9, as the case may be.

Figure 5:
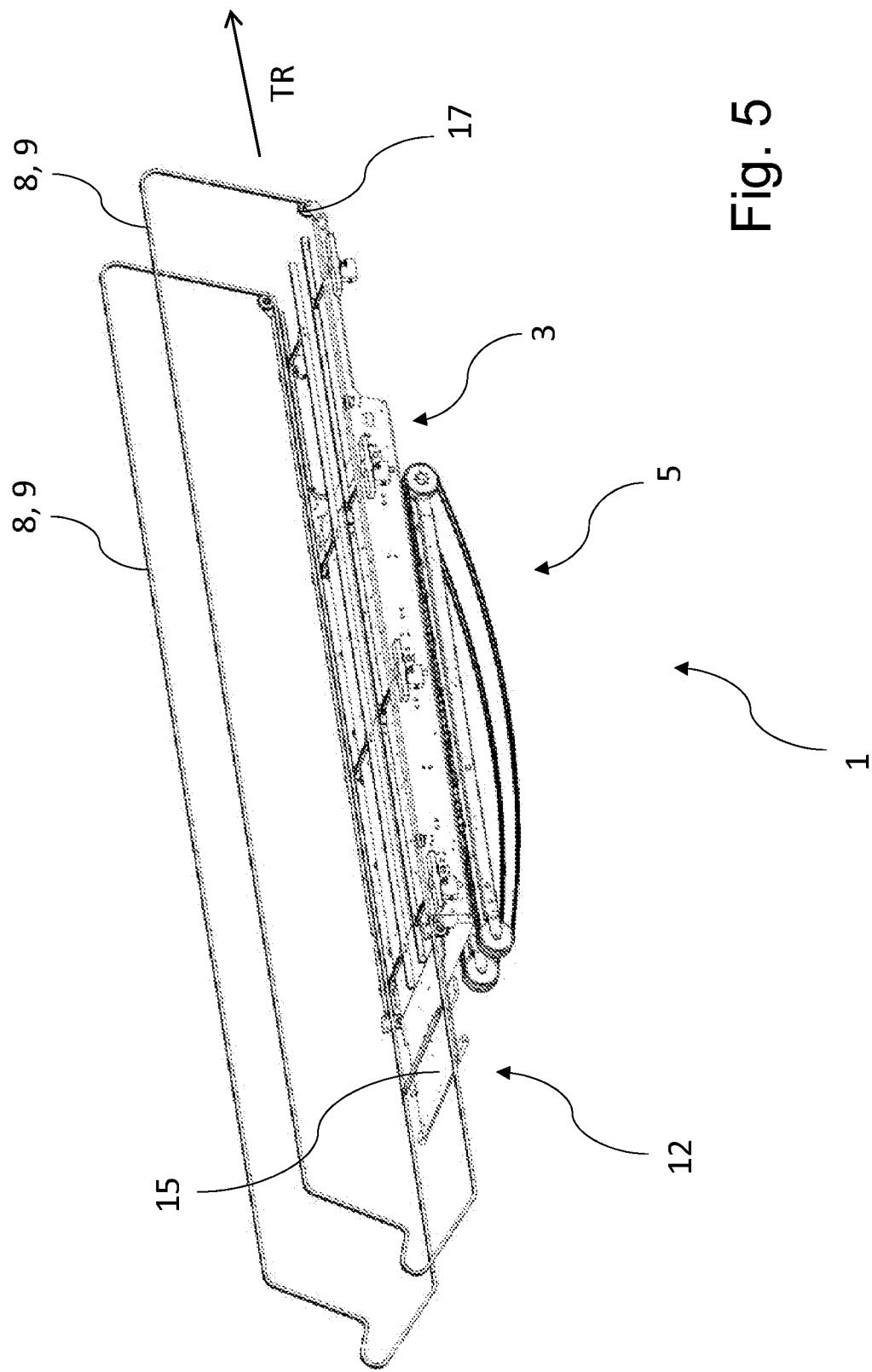
FIG. 5 shows a further schematic perspective view of the embodiment of the apparatus from the FIGS. 1 to 4, with the transport module in the specific operating position.

FIG. 5 shows a further schematic perspective view of the embodiment of an apparatus 1 from the FIGS. 1 to 4, with the transport module 3 in the specific operating position. From FIG. 5 it is moreover discernible that the work module 5 has been transferred into a waiting position provided for the work module 5. The transfer is carried out independently, prompted by the control unit, by way of a working mechanism not illustrated in the Figures of the present patent application. In order to transfer the work module 5 into the waiting position, the work module 5 is lowered in vertical direction below a conveying level for the article sets formed by the apparatus 1. As an alternative to transferring the work module 5 into the waiting position provided for the work module 5, it is conceivable that the work module 5 is removed from the apparatus 1 and, where applicable, kept ready for being inserted again into the specific operating position.

FIG. 6 shows a further schematic side view of the embodiment of the apparatus 1 from the FIGS. 1 to 5, with the transport module 3 in the specific operating position. FIG. 6 and FIG. 3 in conjunction illustrate that the divider rods 13 that are mechanically coupled to the transmission means 8 or to the chains 9, as the case may be, can move sets of beverage containers in transport direction TR, with the divider rods 13 in contact with the rear ends of the sets of beverage containers both when the transport module 3 is inserted in the specific operating position and when the work module 5 is inserted in the specific operating position. If the work module 5 is inserted in the specific operating position, the divider rods 13 that are coupled to the transmission means 8 or to the chains 9, as the case may be, move sets of beverage containers across the slide plate 15, with the divider rods 13 in contact with the rear ends of the sets of beverage containers; and the divider rods 13 lose their contact with the particular article set when the particular set passes over from the slide plate 15 to the work module 5. If the transport module 3 instead of the work module 5 is inserted in the specific operating position, the divider rods 13 that are coupled to the transmission means 8 or to the chains 9, as the case may be, move the sets of beverage containers across the slide plate 15 with the divider rods 13 in contact with the rear ends of the sets of beverage containers, and then push the sets of beverage containers across the transfer plate 20 of the transport module 3, with the contact of the divider rod 13 with the rear end of the particular set of beverage containers being in this context continuously retained or not being undone, as the case may be.

Figure 7:
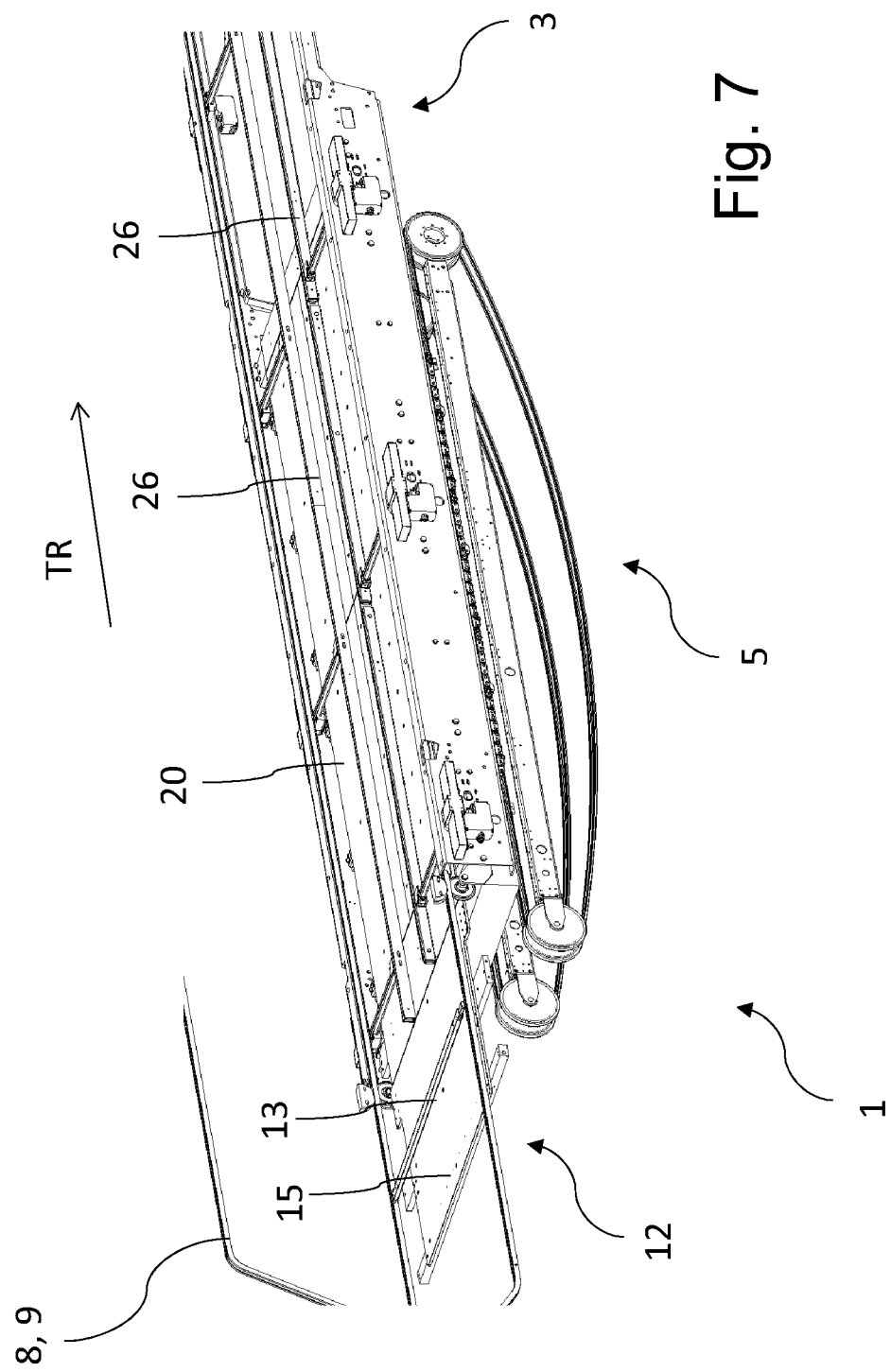
FIG. 7 shows a further schematic perspective view of the apparatus from the FIGS. 1 to 6, with the transport module in the specific operating position.

FIG. 7 shows a further schematic perspective view of the apparatus 1 from the FIGS. 1 to 6, with the transport module 3 in the specific operating position. Two guide walls 26 oriented parallel to each other, with their longitudinal extent being in each instance oriented in transport direction TR, are part of the transport module 3. In order to transport or move, as the case may be, the sets of beverage containers in at least one row, the relative distance of the guide walls 26 in relation to each other can be specified and adapted with the help of an actuator that is in contact with a control unit.

The slide plate 15 across which the sets of beverage containers are moved via the divider rods 13 at least approximately immediately follows the transfer plate 20 of the transport module 3 that is inserted in the specific operating position. Hereby, sets of beverage containers can pass over from the infeed 12 or from the slide plate 15, as the case may be, onto the work module 5 or onto the transfer plate 20, as the case may be, without unwanted tipping over in the process. By the divider rods 13 that are coupled to the transmission means 8 or to the chains 9, as the case may be, the sets of beverage containers are placed from the slide plate 15 onto the transfer plate 20 and then are moved in transport direction TR along the transport module 3 between the guide walls 26 that are located opposite each other If the transport module 3 is in the specific operating position or if the transport module 3 has been inserted into the specific operating position, as the case may be, no blanks formed as packaging material will be introduced into a transport path of the sets of beverage containers between the infeed 12 or the slide plate 15, as the case may be, and the transport module 3 or the transfer plate 20, as the case may be. The sets of beverage containers are moved by the divider rods 13 along the transport module 3 or along the transfer plate 20, as the case may be, without in this context being in contact with a blank of packaging material or without in this context standing on a blank of packaging material, as the case may be. If the transport module 3 is in the specific operating position or if the transport module 3 is inserted in the specific operating position, as the case may be, it is provided that the sets of beverage containers leave the transfer plate 20 or lose their contact to the transfer plate 20 and in this context move onto a blank that takes the form of packaging material. The blank that takes the form of packaging material can be a pad that provides a standing surface for a particular set of beverage containers and that has no flaps being prepared for transfer into an erect orientation.

Figure 8:
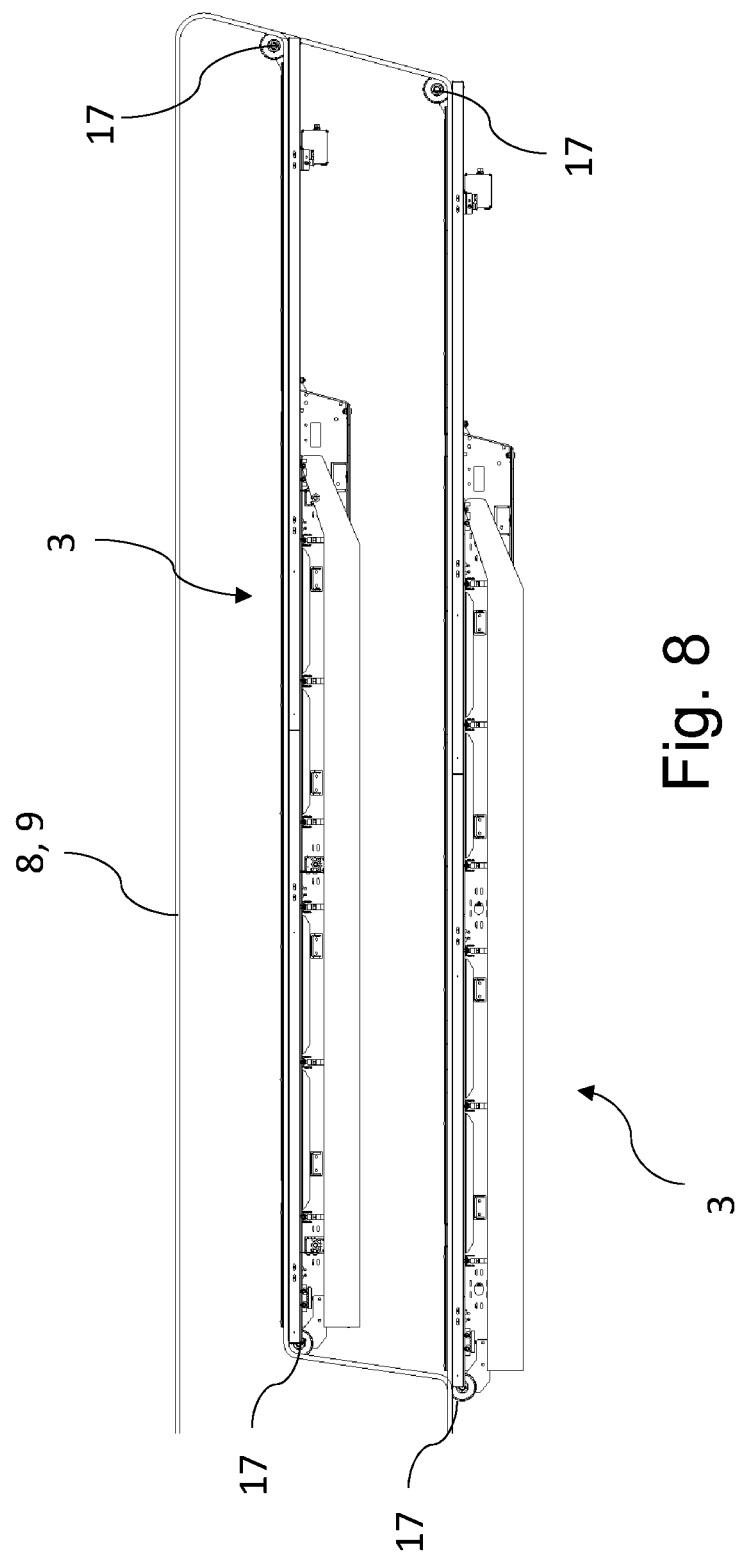
FIG. 8 shows the transport module of the apparatus of the exemplary embodiment from the FIGS. 1 to 7, with the transport module being discernible in the waiting position as well as in the specific operating position in FIG. 8.

FIG. 8 shows the transport module 3 of the apparatus 1 of the exemplary embodiment from the FIGS. 1 to 7, with the transport module 3 being discernible in FIG. 8 in the waiting position as well as in the specific operating position. FIG. 8 in this context shows that the specific operating position is offset both in horizontal direction and in vertical direction in relation to the waiting position. For inserting the transport module 3 that is disposed in the waiting position into the specific operating position, the transport module 3 is therefore moved in horizontal direction and in vertical direction. In this context, the transmission means 8 or the chain 9, as the case may be, is in each instance in contact with the pulleys 17 that are formed as part of the transport module 3.

Figure 9:
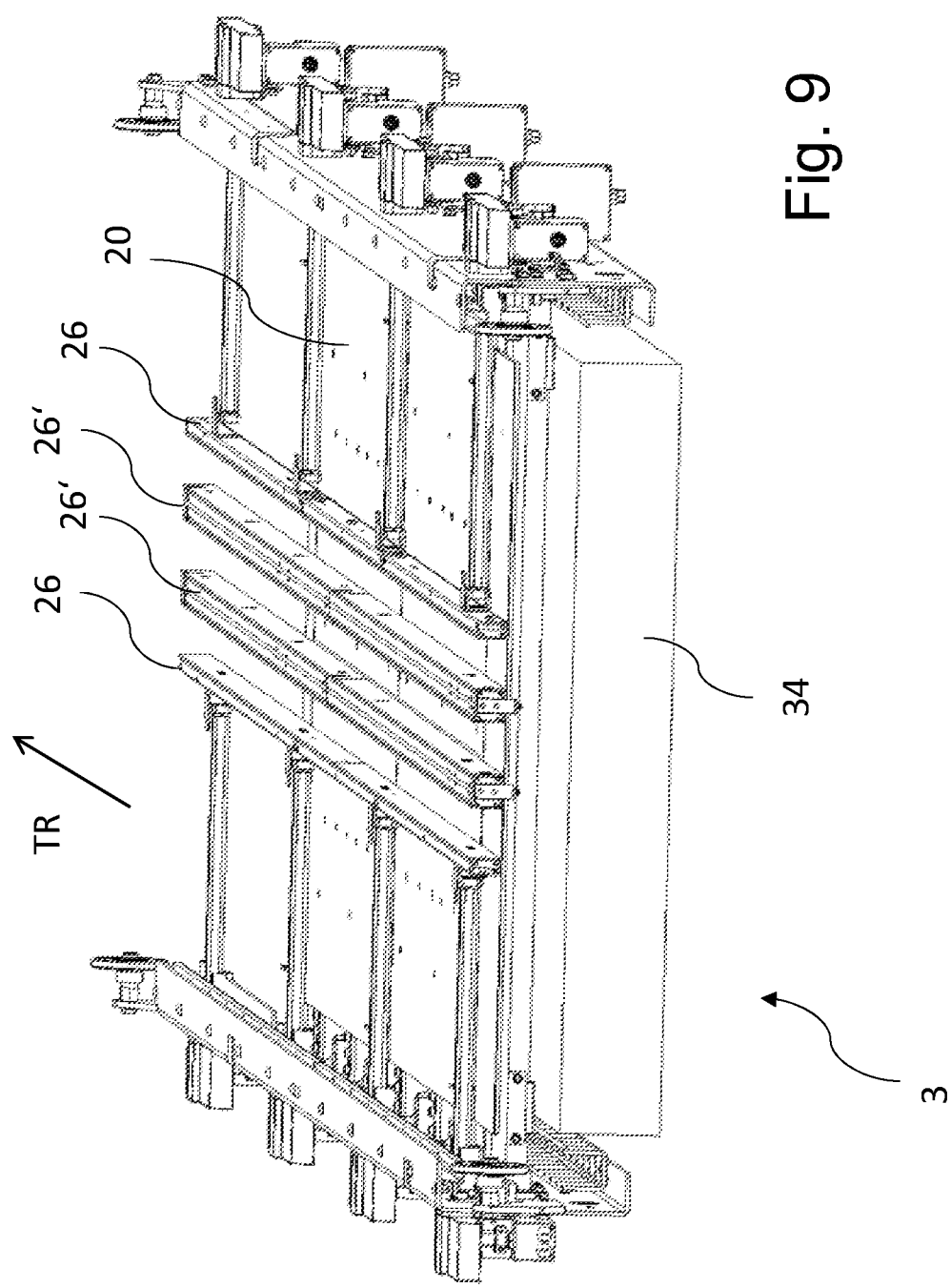
FIG. 9 shows a schematic perspective view of a transport module such as can be provided for various embodiments of the apparatus according to the invention.

FIG. 9 shows a schematic perspective view of a transport module 3 such as can be provided for various embodiments of the apparatus 1 according to the invention. The transport module 3 comprises two central guide walls 26' that are stationary in their relative position to each other as well as two outer guide walls 26 of which the relative position to one another is actuator-adjustable. In this context, the outer guide walls 26 can be moved perpendicular to the transport direction TR.

FIG. 9 also shows a feed 34 for planar blanks of packaging material. The feed 34 is formed as part of the transport module 3. The blanks of packaging material that can be introduced into a transport path of the sets of beverage containers by the feed 34 are formed as pads and have no flaps that are prepared for transfer into an erect orientation. As already mentioned above, the sets of beverage containers are moved in surface contact with the transfer plate 20 in transport direction TR along the work module 5, then lose their surface contact with the transfer plate 20 and move onto a particular blank of packaging material or onto a particular pad, as the case may be. If the transport module 3 is in the specific operating position or if the transport module 3 is inserted in the specific operating position, as the case may be, a first section is thus provided, via which blanks of packaging material pass into the transport path of the sets of beverage containers. If the work module 5 is in the specific operating position or if the work module 5 is inserted in the specific operating position, as the case may be, a second section is provided, via which blanks of packaging material pass into the transport path of the sets of beverage containers. The first section and the second section are offset in relation to each other in transport direction TR or along the transport path of the article sets, as the case may be.

Figure 10:
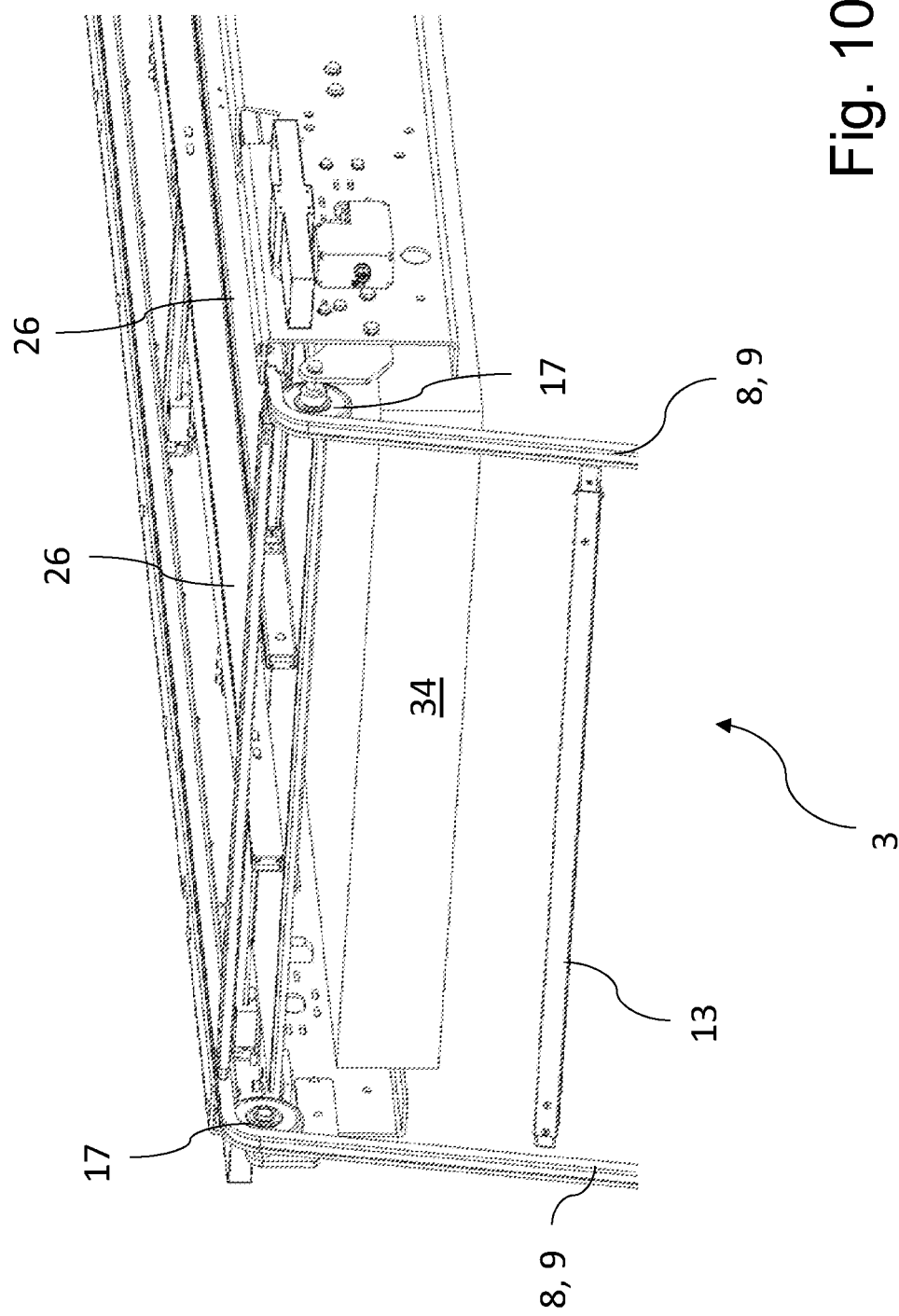
FIG. 10 shows a further schematic perspective view of the transport module from FIG. 9 with further aspects being illustrated.

FIG. 10 shows a further schematic perspective view of the transport module 3 from FIG. 9 with further aspects being illustrated. Thus, the transmission means 8 that are made from a plurality of individual links rotationally movably linked to each other or the chains 9, as the case may be, to which the divider rods 13 are mechanically coupled, are once more discernible in FIG. 10. In FIG. 10, the transport module 3 is in the waiting position (cf. FIG. 8) so that the pulleys 17 formed as part of the transport module 3 guide the transmission means 8 or the chain 9 downward, as the case may be.

FIG. 11 shows a schematic perspective view from below onto the transport module 3 from FIGS. 9 and 10. The feed 34 is shown again, via which feed 34 planar packaging blanks formed by a pad each can be introduced into the transport path of the sets of beverage containers. Moreover, a pulley 17 is illustrated again, which pulley 17 is in engagement with the transmission means 8 or with the chain 9, as the case may be, neither of which are illustrated in FIG. 11. FIG. 11 furthermore shows the guide walls 26 located opposite each other, the relative distance of which guide walls 26 to each other can be adapted for the purpose of adjusting a particular lane width for the particular sets of beverage containers.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 Apparatus
3 Transport module
5 Work module
7 Folding finger
8 Transmission means
9 Chain
12 Infeed
13 Divider rod
15 Slide plate
17 Pulley
20 Transfer plate
22 Guide member
24 Deflection member
26 Guide wall
34 Feed
TR Transport direction

The invention claimed is:

1. An apparatus with at least two modules being selectively transferable into an operating position for handling of individual articles or article sets, comprising:
at least one transport module comprising a horizontal transport surface formed by at least one least one transport plate that is capable of moving individual articles or article sets on a horizontal conveying level when the at least one transport module is positioned at the operating position;
at least one work module capable of moving individual articles or article sets when the at least one work module is positioned at the operating position and the at least one work module being able to handle packaging material with which the individual articles or article sets are in contact with during movement by the at least one work module;
wherein the at least one transport module is configured to, independently of the at least one work module, be removed from the operating position and transferred into a waiting position, or inserted from the waiting position into the operating position, and
wherein the at least one work module is configured to, independently of the at least one transport module, be transferred from the operating position into a further waiting position, or inserted from the further waiting position into the operating position, and
at least one transmission means comprising at least one circumferentially guided chain, and the at least one transmission means:
a) is mechanically coupled to the at least one transport module and interacts with the at least one transport module, when in the operating position, for moving the individual articles or article sets, and
b) is configured to adapt a course of the at least one circumferentially guided chain based on a change of the at least one transport module from the operating position into the waiting position and from the waiting position into the operating position,
a plurality of circumferentially guided transport elements coupled to the at least one transmission means, wherein the plurality of circumferentially guided transport elements provides sliding movement of the individual articles or article sets across the horizontal transport surface,
wherein the waiting position, into which the at least one transport module is transferable, is positioned above the horizontal conveying level, or wherein the further waiting position, into which the at least one working module is transferable, is positioned below the horizontal conveying level.

2. The apparatus of claim 1, wherein the at least one transport module comprises at least two guide walls located opposite each other, wherein a distance between the at least two guide walls can be adapted to set a width of a transport lane for the individual articles or article sets.

3. The apparatus of claim 2, each of the plurality of circumferentially guided transport elements contact rear ends of the individual articles or article sets when the at least one transport module is inserted in the operating position.

4. The apparatus of claim 3, wherein the at least one work module comprises a plurality of circumferentially guided folding fingers, wherein flaps belonging to packaging blanks in contact with the individual articles or article sets can be erected during movement of the individual articles or article sets.

5. The apparatus of claim 4, further comprising at least one guide member wherein the at least one guide member is able to assume at least two different locations or positions that are coordinated with the change of the at least one transport module from the operating position into the waiting position or from the waiting position into the operating position.

6. A method for selectively transferring at least two modules into an operating position, the method comprising:
  providing the apparatus according to claim 1;
  removing the at least one transport module from the operating position, transferring the at least one transport module into the waiting position, and inserting the at least one work module into the operating position; and, then,
  removing the at least one work module from the operating position, transferring the at least one work module into the further waiting position, and inserting the at least one transport module that is located in the waiting position into the operating position;
  wherein, while removing or inserting the at least one transport module from the operating position:
   a) a mechanical connection is maintained between the at least one transmission means and the at least one transport module, and
   b) the at least one transmission means adapts the course of the at least one circumferentially guided chain based on a change of the at least one transport module from the operating position into the waiting position and from the waiting position into the operating position; and
  providing sliding movement of the individual articles or article sets across the horizontal transport surface with the plurality of circumferentially guided transport elements coupled to the at least one transmission means.

7. The method of claim 6, wherein the plurality of transport elements contact rear ends of the individual articles or article sets as the individual articles or article sets move along the horizontal transport surface when the at least one transport module is in the operating position.

8. The method of claim 7, wherein the at least one work module, in the operating position, erects, by a plurality of circumferentially guided folding fingers, flaps belonging to packaging blanks in contact with the individual articles or article sets, and moving the individual articles or article sets by the plurality of circumferentially guided folding fingers while the flaps are being erected, wherein, the individual articles or article sets are at least temporarily accompanied by an individual transport element that is in contact with the rear ends of the individual articles or article sets.

9. The method of claim 8, further comprising adjusting a position or location of a guide member when the at least one transport module is being transferred from the operating position into the waiting position or from the waiting position into the operating position.

* * * * *